(12) United States Patent
Ichikawa

(10) Patent No.: US 9,162,583 B2
(45) Date of Patent: Oct. 20, 2015

(54) POWER CONTROL DEVICE AND POWER CONTROL METHOD

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 530 days.

(21) Appl. No.: 13/514,420

(22) PCT Filed: Dec. 8, 2010

(86) PCT No.: PCT/IB2010/003130
§ 371 (c)(1),
(2), (4) Date: Jun. 7, 2012

(87) PCT Pub. No.: WO2011/098860
PCT Pub. Date: Aug. 18, 2011

(65) Prior Publication Data
US 2012/0277945 A1 Nov. 1, 2012

(30) Foreign Application Priority Data

Dec. 25, 2009 (JP) ................. 2009-295564

(51) Int. Cl.
*B60L 11/00* (2006.01)
*H02J 7/04* (2006.01)
(Continued)

(52) U.S. Cl.
CPC ......... *B60L 11/1838* (2013.01); *B60L 11/1816* (2013.01); *H02J 7/0004* (2013.01); *H02J 7/007* (2013.01); *H02J 7/04* (2013.01); *Y02T 10/7005* (2013.01); *Y02T 90/121* (2013.01);
(Continued)

(58) Field of Classification Search
CPC ............ B60L 11/1816; B60L 11/1824; B60L 11/1838; B60L 11/1844; H02J 7/0004; H02J 7/0008; H02J 7/0009; H02J 7/007; H02J 7/04; H02J 7/045; Y02T 90/128
USPC ............ 701/22; 307/9.1, 10.1, 112, 116, 125, 307/126; 320/101, 109, 110, 128, 138, 160
See application file for complete search history.

(56) References Cited

U.S. PATENT DOCUMENTS

| 5,202,617 A | 4/1993 | Nor |
| 5,341,083 A | 8/1994 | Klontz et al. |
| 5,596,258 A | 1/1997 | Kimura et al. |

FOREIGN PATENT DOCUMENTS

| JP | A-6-245325 | 9/1994 |
| JP | A-6-269130 | 9/1994 |
| JP | A-7-298506 | 11/1995 |
| JP | A-2009-171733 | 7/2009 |

OTHER PUBLICATIONS

Society of Automotive Engineers: "SAEJ1772," Aug. 1, 2001, http://www.arb.ca.gov/msprog/zevprog/stakeholders/infrastructure/finalsaej1772.doc. International Search Report issued in International Patent Application No. PCT/IB2010/003130 dated Apr. 16, 2012.

(Continued)

*Primary Examiner* — Spencer Patton
(74) *Attorney, Agent, or Firm* — Oliff PLC

(57) ABSTRACT

A power control device that controls electric power supplied from an external power supply to a vehicle includes: a switching unit that switches a supply voltage value of the external power supply; and a control unit that generates a signal, indicating an allowable current value of the external power supply, to transmit the signal to the vehicle, and that controls the switching unit to thereby control the supply voltage value, wherein the control unit changes the signal and the supply voltage value on the basis of a given electric power command value.

11 Claims, 10 Drawing Sheets

CHARGING STATION

ELECTROMOTIVE VEHICLE

(51) Int. Cl.
*B60L 11/18* (2006.01)
*H02J 7/00* (2006.01)

(52) U.S. Cl.
CPC ............... *Y02T 90/128* (2013.01); *Y02T 90/14* (2013.01); *Y02T 90/163* (2013.01)

(56) References Cited

OTHER PUBLICATIONS

Written Opinion issued in International Patent Application No. PCT/IB2010/003130 dated Apr. 16, 2012.

POWER CONTROL DEVICE AND POWER CONTROL METHOD

BACKGROUND OF THE INVENTION

1. Field of the Invention

The invention relates to a power control device and power control method that control electric power supplied from an external power supply to a vehicle.

2. Description of the Related Art

An electromotive vehicle, such as an electric vehicle and a hybrid electric vehicle, is in practical use. The electromotive vehicle is propelled by a motor that is driven by electric power stored in an electrical storage device. In addition, in recent years, development of a so-called plug-in vehicle has been proceeding. The plug-in vehicle includes a system that charges an electrical storage device with power supplied from an external power supply called, a charging station, or the like.

In connection with charging control over such a plug-in vehicle, for example, Japanese Patent Application Publication No. 6-245325 (JP-A-6-245325) describes a technique for simplifying charging operation. An electric vehicle described in JP-A-6-245325 includes a battery, a charging line for charging the battery, and a communication device that is connected to the charging line. On the other hand, an external power supply that supplies electric power to the electric vehicle includes a charging line, and a communication device that is connected to the charging line. When a connector of the electric vehicle is connected to a connector of the external power supply, the communication device of the electric vehicle transmits charging information, such as the type or voltage of the battery, to the communication device of the external power supply via the charging lines. The communication device of the external power supply charges the battery of the electric vehicle automatically in an optimal condition in accordance with the charging information from the electric vehicle. By so doing, charging operation for charging the battery of the electric vehicle may be simplified.

As described above, JP-A-6-245325 describes that communication is carried out between the electric vehicle and the external power supply and then control for charging the electric vehicle is executed at the side of the external power supply on the basis of the communication information. However, JP-A-6-245325 does not describe specific details of the communication information and a method of generating the communication information.

Particularly, the range of information that is transmittable by a signal transmitted from the external power supply to the electromotive vehicle (for example, the range of allowable current value of the external power supply, which is transmittable by a pilot signal) is limited to a value that falls within a predetermined range because of the specifications of the signal or the physical requirements of the external power supply. Therefore, there is a problem that a power range that allows control for charging the electromotive vehicle is limited. JP-A-6-245325 describes nothing about the above problem or measures therefor.

SUMMARY OF INVENTION

The invention provides a power control device and power control method that are able to minutely control electric power supplied from an external power supply to a vehicle using a signal generated by the external power supply.

A first aspect of the invention provides a power control device that controls electric power supplied from an external power supply to a vehicle. The power control device includes: a switching unit that switches a supply voltage value of the external power supply; and a control unit that generates a signal, indicating an allowable current value of the external power supply, to transmit the signal to the vehicle, and that controls the switching unit to thereby control the supply voltage value, wherein the control unit changes the signal and the supply voltage value on the basis of a given electric power command value.

The control unit may set a current command value and a voltage command value on the basis of the electric power command value. In this case, the control unit may generate the signal so that the allowable current value is equal to the current command value, and may control the switching unit so that the supply voltage value is equal to the voltage command value.

The allowable current value may have a lower limit value and an upper limit value. In this case, the control unit may set the current command value and the voltage command value so that the current command value falls within the range from the lower limit value to the upper limit value and the product of the current command value and the voltage command value is equal to the electric power command value.

The switching unit may be configured to switch the supply voltage value to any one of a first voltage value and a second voltage value that is higher than the first voltage value. In this case, when the electric power command value is smaller than a threshold that is the product of the second voltage value and the lower limit value, the control unit may set the voltage command value to the first voltage value and may set the current command value to a value obtained by dividing the electric power command value by the first voltage value, and, when the electric power command value is larger than the threshold, the control unit may set the voltage command value to the second voltage value and may set the current command value to a value obtained by dividing the electric power command value by the second voltage value.

The switching unit may be configured to switch the supply voltage value to any one of a first voltage value, a second voltage value that is higher than the first voltage value, and a third voltage value that is higher than the second voltage value. In this case, when the electric power command value is smaller than a first threshold that is the product of the second voltage value and the lower limit value, the control unit may set the voltage command value to the first voltage value and may set the current command value to a value obtained by dividing the electric power command value by the first voltage value, when the electric power command value falls within the range from the first threshold to a second threshold that is the product of the third voltage value and the lower limit value, the control unit may set the voltage command value to the second voltage value and may set the current command value to a value obtained by dividing the electric power command value by the second voltage value, and, when the electric power command value is larger than the second threshold, the control unit may set the voltage command value to the third voltage value and may set the current command value to a value obtained by dividing the electric power command value by the third voltage value.

The switching unit may be a switch circuit that is provided in any location of a power supply line extending from the external power supply.

The signal may be a pilot signal that oscillates with a pulse width corresponding to the allowable current value. In addition, the control unit may transmit the pilot signal to the vehicle via a communication line. In addition, the vehicle may execute control for charging an electrical storage device equipped for the vehicle on the basis of the pilot signal received from the control unit.

A second aspect of the invention provides a power control method that controls electric power supplied from an external power supply to a vehicle. The power control method includes: generating a signal, indicating an allowable current value of the external power supply, to transmit the signal to the vehicle; controlling a switching unit that switches a supply voltage value of the external power supply to thereby control the supply voltage value; and changing the signal and the supply voltage value on the basis of a given electric power command value.

According to the aspects of the invention, it is possible to minutely control electric power supplied from an external power supply to a vehicle using a signal generated by the external power supply.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
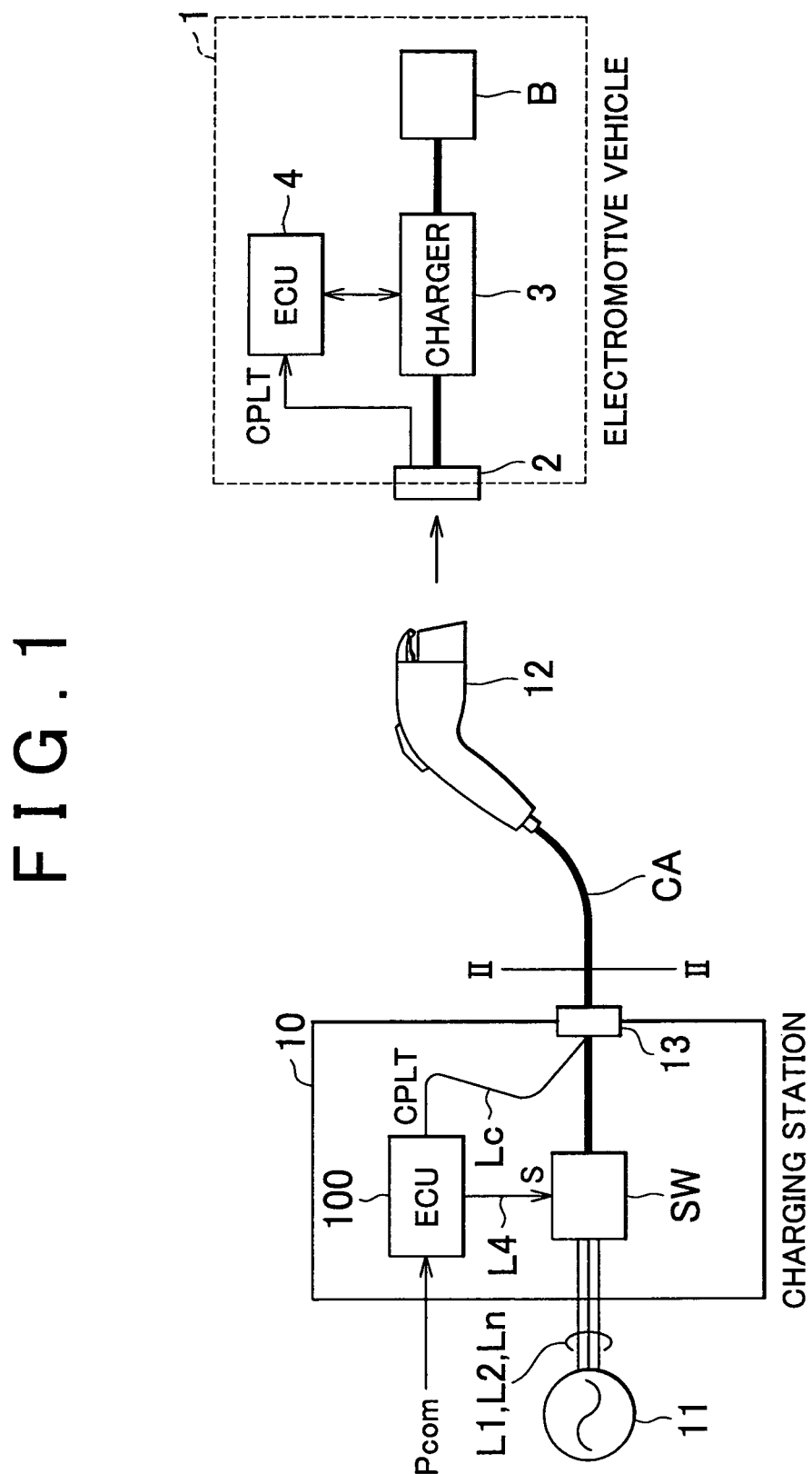
FIG. 1 is a schematic view of a charging station that is equipped with a power control device according to a first embodiment.

Hereinafter, embodiments of the invention will be described in detail with reference to the accompanying drawings. Like reference numerals in the drawings denote the same or corresponding components, and the description thereof will not be repeated. In the following description, specific values are, for example, used for a voltage value, a current value and an electric power value; however, the aspect of the invention is not limited to those specific values.

First Embodiment

FIG. 1 is a schematic view of a charging station 10 that is equipped with a power control device according to a first embodiment of the invention. The charging station 10 is an alternating-current power supply that is exclusively provided in order to charge an electrical storage device equipped for an electromotive vehicle, such as a vehicle 1. Note that the charging station 10 may be a direct-current power supply.

The vehicle 1 is an electromotive vehicle that is propelled by a motor (not shown) driven by electric power of an electrical storage device B. The vehicle 1 may be an electric vehicle that includes only a motor as a driving source or may be a hybrid electric vehicle that includes a motor and an engine.

The vehicle 1 is a so-called plug-in vehicle, and includes a charging system for charging the electrical storage device B with alternating-current power supplied from the external charging station 10. The charging system includes an inlet 2, a charger 3 and an ECU 4. The inlet 2 is configured to be connected with a connector 12 of a charging cable CA extending from the charging station 10. The charger 3 converts alternating-current power supplied from the charging station 10 to direct-current power that may be used to charge the electrical storage device B and then supplies the direct-current power to the electrical storage device B in accordance with a control signal from the ECU 4.

When the connector 12 of the charging cable CA is connected to the inlet 2 of the vehicle 1, a pilot signal CPLT (which will be described later) generated by an ECU 100 of the charging station 10 is input to the ECU 4 via the charging cable CA and the inlet 2. The ECU 4 controls the charger 3 on the basis of information, such as the pilot signal CPLT, to thereby execute control for charging the electrical storage device B.

On the other hand, the charging station 10 includes a commercial power supply 11, a switching device SW, the charging cable CA and the ECU 100.

The commercial power supply 11 is a so-called single-phase three-wire system alternating-current power supply that is widely used in Japan, and the like.

One end of the charging cable CA is connected to the switching device SW via a connecting portion 13, and the other end of the charging cable CA is connected to the connector 12. The connector 12 is configured to be connected with the inlet 2 of the vehicle 1. Note that it is applicable that the connecting portion 13 is formed of a connector and then the charging cable CA and the charging station 10 are detachable from each other.

Figure 2:
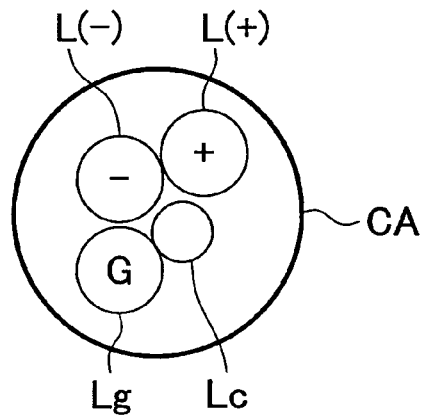
FIG. 2 is a cross-sectional view of a charging cable according to the first embodiment.

FIG. 2 is a cross-sectional view of the charging cable CA, taken along the line II-II in FIG. 1. As shown in FIG. 2, the charging cable CA is formed so that power lines L(−) and L(+) that extend from the switching device SW, a ground line Lg, and a pilot signal line Lc that extends from the ECU 100 are tied in a bundle as one cable.

Referring back to FIG. 1, the switching device SW is provided between the commercial power supply 11 and the charging cable CA. The switching device SW switches the voltage, which is supplied from the charging station 10 to the vehicle 1 via the charging cable CA (hereinafter, simply referred to as supply voltage), to any one of a voltage V1 and a voltage V2. Note that, in the first embodiment, the case where the voltage V1 is 100 volts and the voltage V2 is 200 volts will be described as an example.

The commercial power supply 11 and the switching device SW are connected by power lines L1 and L2 and a neutral line Ln. The power line L1 is supplied with 100-volt alternating-current power from the commercial power supply 11. The power line L2 is supplied from the commercial power supply 11 with 100-volt alternating-current power, which is shifted by 180 degrees in phase from that of the power line L1.

Figure 3:
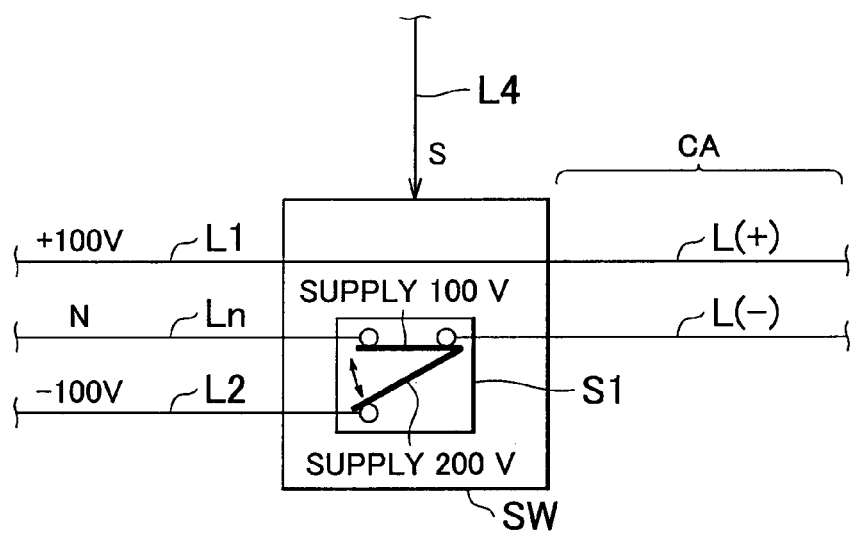
FIG. 3 is a schematic view of a switching device.

FIG. 3 schematically shows the inside of the switching device SW. The power line L(+) of the charging cable CA is directly coupled to the power line L1 from the commercial power supply 11.

The switching device SW has a switch circuit S1 that connects the power line L(−) of the charging cable CA to any one of the neutral line Ln and the power line L2 that extend from the commercial power supply 11. The switch circuit S1. switches a connected destination of the power line L(−) to any one of the neutral line Ln and the power line L2 in accordance with a switching signal S transmitted from the ECU 100 via a communication line L4.

When the connected destination of the power line L(−) is the neutral line Ln, the supply voltage is 100 volts (voltage V1) that is a potential difference between the power line L(+) and the power line L(−).

On the other hand, when the connected destination of the power line L(−) is the power line L2, the supply voltage is 200 volts (voltage V2) that is a potential difference between the power line L(+) and the power line L(−).

Referring back to FIG. 1, the ECU 100 generates a switching signal S and then transmits the switching signal S to the switching device SW, and also generates a pilot signal CPLT and then transmits the pilot signal CPLT to the vehicle 1 via the pilot signal line Lc. The pilot signal CPLT is a signal that indicates an allowable current value of the charging station 10 (current value that the charging station 10 is able to supply to an electromotive vehicle, such as the vehicle 1, via the charging cable CA). As the pilot signal CPLT is transmitted to the vehicle 1, the allowable current value of the charging station 10 is transmitted to the vehicle 1.

Figure 4:
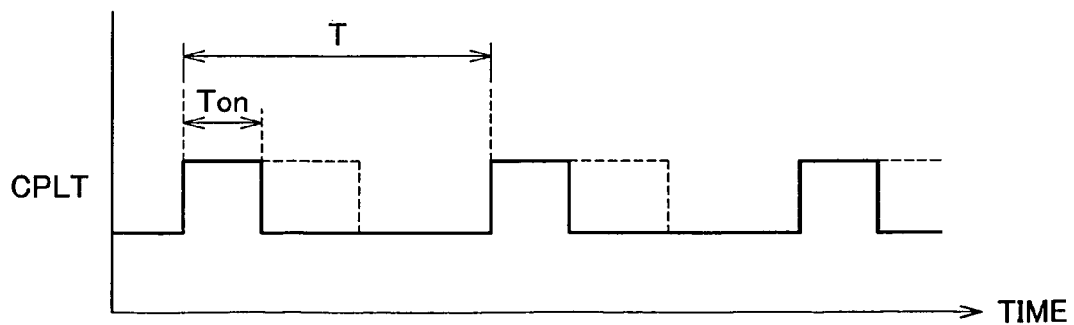
FIG. 4 is a waveform chart of a pilot signal.

FIG. 4 is a waveform chart of the pilot signal CPLT generated by the ECU 100. The pilot signal CPLT oscillates at a given period T (for example, 1 kHz). A duty ratio D that is the ratio of a pulse width Ton to the period T (that is, D=Ton/T× 100 (%)) is set to a value corresponding to the allowable current value of the charging station 10.

The ECU 4 of the vehicle 1 receives the pilot signal CPLT via the inlet 2, and detects the duty ratio D of the received pilot signal CPLT to thereby acquire the allowable current value of the charging station 10, and then controls the charger 3 in accordance with the acquired allowable current value. Therefore, the ECU 4 of the vehicle 1 is able to control electric power for charging the vehicle 1 using the pilot signal CPLT. However, normally, a specification lower limit value is set for the current value that is transmittable by the duty ratio D of the pilot signal CPLT. In addition, the allowable current value of the charging station 10 also has an upper limit value (current capacity) that is determined depending on physical requirements of the charging cable CA, the inlet 2, and the like. Thus, the current value that is transmittable by the duty ratio D of the pilot signal CPLT is limited to a value that falls within the range between the above described lower limit value and upper limit value.

For example, when the lower limit value is 6 amperes and the upper limit value is 12 amperes, the available current value is limited to a value that falls within the range from 6 amperes to 12 amperes. When the supply voltage is fixed to 100 volts in such a situation, a controllable charging electric power value is limited to a value that falls within the narrow range from 600 watts (which is equal to 100 volts multiplied by 6 amperes) to 1200 watts (which is equal to 100 volts multiplied by 12 amperes). It is presumable that this may result in insufficient charging control.

In order to solve such a problem, in the first embodiment, the above described switching device SW is provided, and the ECU 100 executes both variable control of the duty ratio D of the pilot signal CPLT and switching control of the supply voltage (control of the switching device SW) on the basis of an electric power command value Pcom input from an outside by user's operation, or the like.

Figure 5:
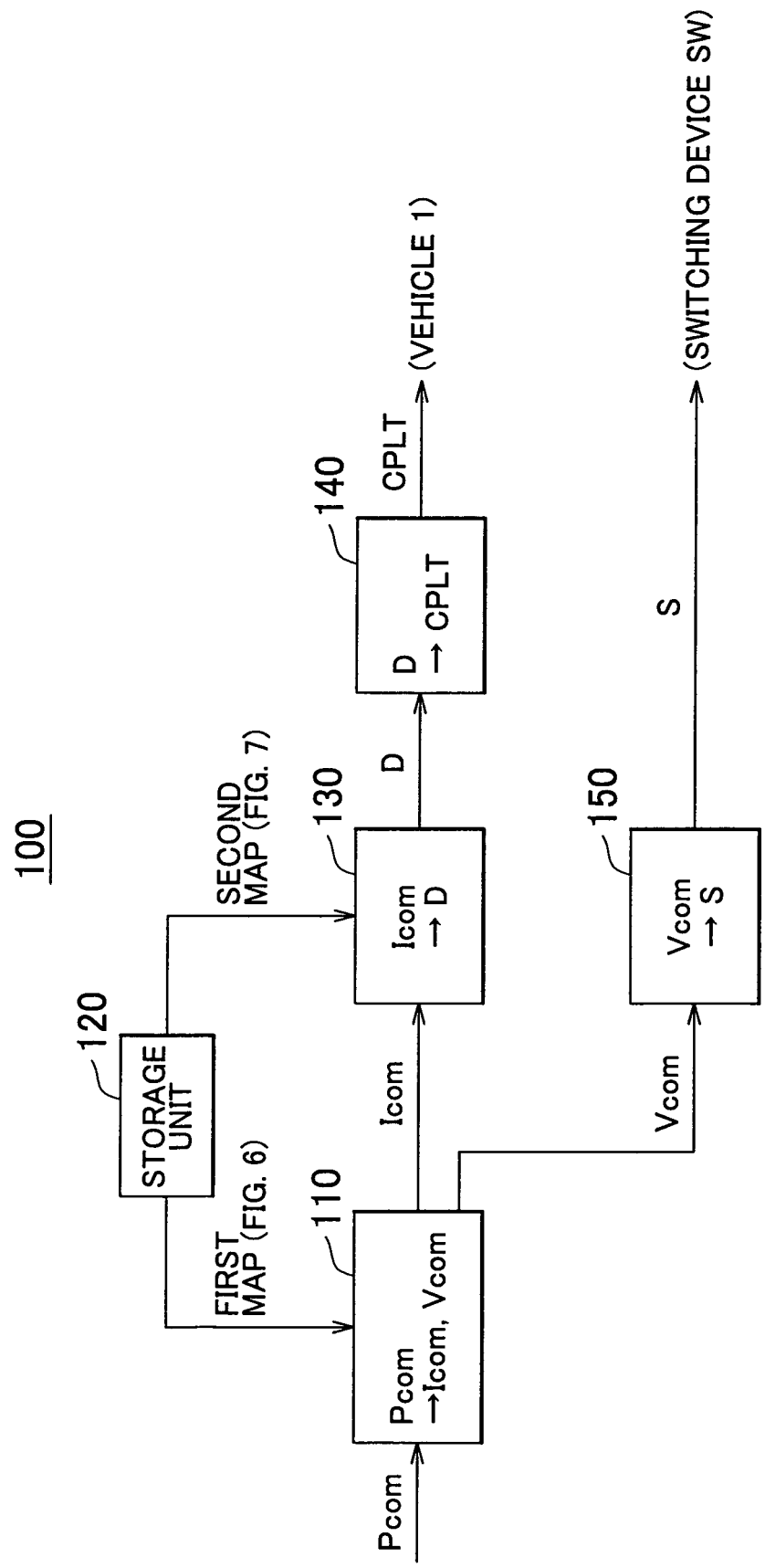
FIG. 5 is a functional block diagram of an ECU.

FIG. 5 is a functional block diagram of a portion of the ECU 100, related to variable control of the duty ratio D and switching control of the supply voltage. Note that the functional blocks shown in FIG. 5 may be implemented in such a manner that hardware (electronic circuit, or the like) having the functions is provided for the ECU 100 or may be implemented in such a manner that software processing (execution of a program, or the like) corresponding to the functions is performed by the ECU 100.

The ECU 100 includes a calculation unit 110, a storage unit 120, a conversion unit 130, a first generation unit 140 and a second generation unit 150.

The calculation unit 110 refers to a first map stored in the storage unit 120 to thereby calculate a voltage command value Vcom and a current command value Icom corresponding to the electric power command value Pcom. Here, the electric power command value Pcom is a command value of electric power supplied from the charging station 10 to the vehicle 1, and is input from an outside to the calculation unit 110 through user's operation, or the like. The voltage command value Vcom is a command value of supply voltage. The current command value Icom is a value corresponding to the allowable current value of the charging station 10, and is a value used to determine the duty ratio D of the pilot signal CPLT.

Figure 6:
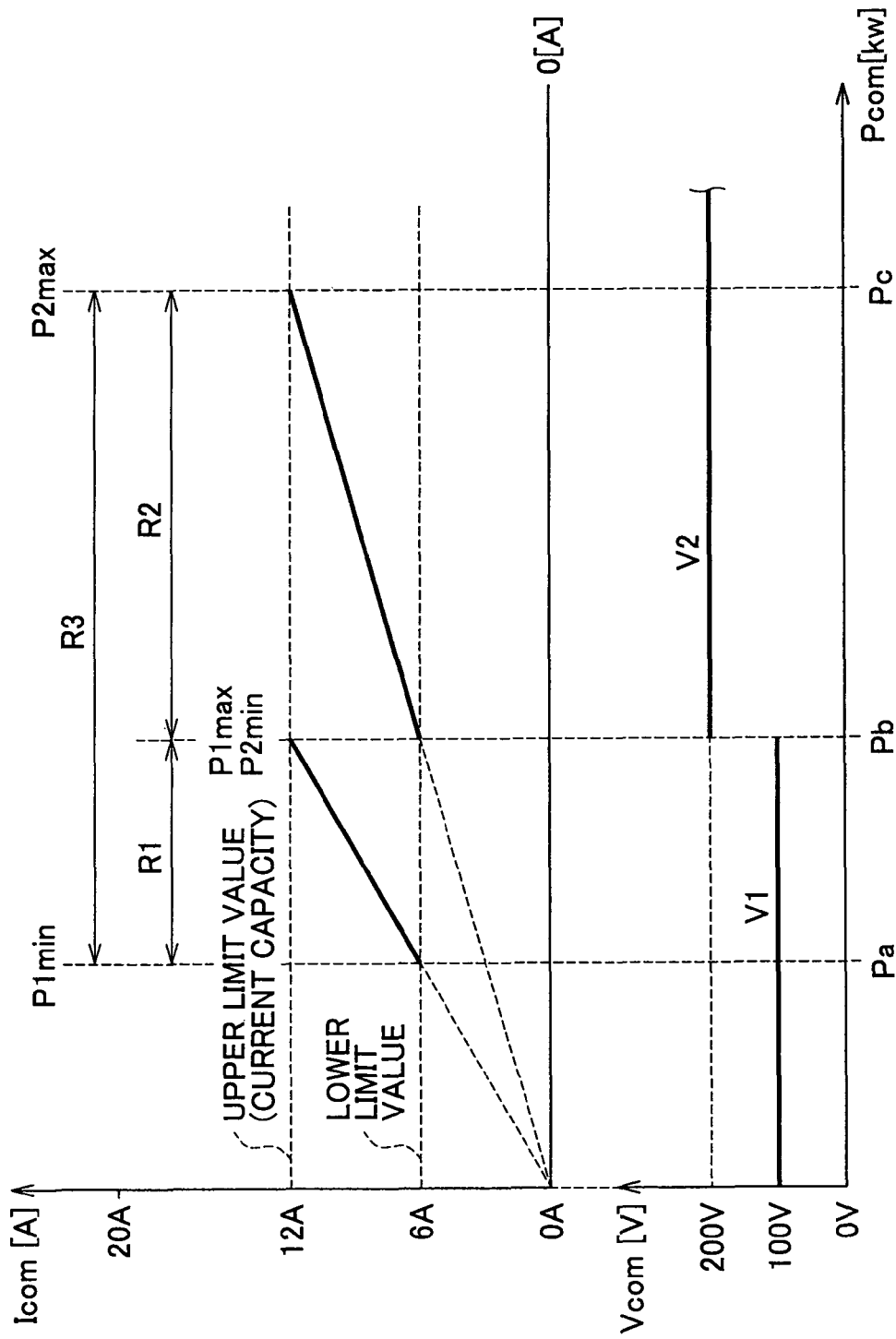
FIG. 6 is a first map used to calculate a voltage command value and a current command value according to the first embodiment.

FIG. 6 shows a first map used to calculate the voltage command value Vcom and the current command value Icom. Note that, in the following description, P1min and P2min respectively denote electric power values when the supply current is a lower limit value and the supply voltages are the voltages V1 and V2, and P1max and P2max respectively denote electric power values when the supply current is an upper limit value and the supply voltages are the voltages V1 and V2. In the first embodiment, because the voltage V1 is 100 volts, the voltage V2 is 200 volts, the lower limit value of the supply current is 6 amperes and the upper limit value of the supply current is 12 amperes, P1min is 0.6 kilowatts (100 volts multiplied by 6 amperes), P1max is 1.2 kilowatts (100 volts multiplied by 12 amperes), P2min is 1.2 kilowatts (200 volts multiplied by 6 amperes) and P2max is 2.4 kilowatts (200 volts multiplied by 12 amperes).

The first map prestores the voltage command value Vcom and current command value Icom corresponding to the electric power command value Pcom.

The voltage command value Vcom is set to the voltage V1 when the electric power command value Pcom is smaller than a threshold Pb, and is set to the voltage V2 when the electric power command value Pcom is larger than the threshold Pb. Here, the threshold Pb is set to the electric power value P2min (that is, the product of the voltage V2 and the lower limit value). In the example shown in FIG. 6, the threshold Pb is the electric power value P2min and is 1.2 kilowatts. Note that, in the example shown in FIG. 6, the electric power value P1max is also 1.2 kilowatts, and the threshold Pb is the same value as the electric power value P1max.

On the other hand, the current command value Icom is set so as to satisfy the relationship that Icom is equal to Pcom divided by Vcom when Icom ranges from the lower limit value to the upper limit value. In the example shown in FIG. 6, when the electric power command value Pcom falls within the range from the threshold Pa to the threshold Pb, the current command value Icom is set to Pcom divided by V1, and, when the electric power command value Pcom falls within the range from the threshold Pb to the threshold Pc, the current command value Icom is set to Pcom divided by V2. Here, the threshold Pa is set to the electric power value P1min (the product of the voltage V1 and the lower limit value), and the threshold Pc is set to the electric power value P2max (the product of the voltage V2 and the upper limit value). In the example shown in FIG. 6, the threshold Pa is set to 0.6 kilowatts, and the threshold Pc is set to 2.4 kilowatts.

The range in which the electric power command value Pcom is smaller than the threshold Pa is an uncontrollable range in which the current command value Icom is smaller than the lower limit value. Within the uncontrollable range, the current command value Icom is not set. In addition, the range in which the electric power command value Pcom is larger than the threshold Pc is a control prohibiting range in which the current command value Icom exceeds the upper limit value. Within the control prohibiting range, the current command value Icom is not set.

When the voltage command value Vcom is fixed to the voltage V1, the current command value Icom exceeds the upper limit value when the electric power command value Pcom exceeds the threshold Pb. Thus, the controllable power range is limited to the range indicated by R1 in FIG. 6, that is, the range from P1min to P1max.

In addition, when the voltage command value Vcom is fixed to the voltage V2, the current command value Icom is lower than the lower limit value when Pcom is smaller than the threshold Pb. Thus, the controllable power range is limited to the range indicated by R2 in FIG. 6, that is, the range from P2min to P2max.

Then, in the first map, when the electric power command value Pcom is smaller than the threshold Pb, the voltage command value Vcom is set to the voltage V1; whereas, when the electric power command value Pcom exceeds the threshold Pb, the voltage command value Vcom is switched to the voltage V2 higher than the voltage V1. By so doing, even when the electric power command value Pcom exceeds the threshold Pb, the current command value Icom may be suppressed to a value lower than the upper limit value when the electric power command value Pcom is lower than the threshold Pc. Therefore, the controllable power range in the first embodiment is the range indicated by R3 in FIG. 6, that is, the range from P1min to P2max, and is wider than the range R1 or the range R2 for which the voltage command value Vcom is fixed to the voltage V1 or V2.

Referring back to FIG. 5, the conversion unit 130 refers to a second map stored in the storage unit 120 to thereby convert the current command value Icom, calculated by the calculation unit 110, to the duty ratio D of the pilot signal CPLT.

Figure 7:
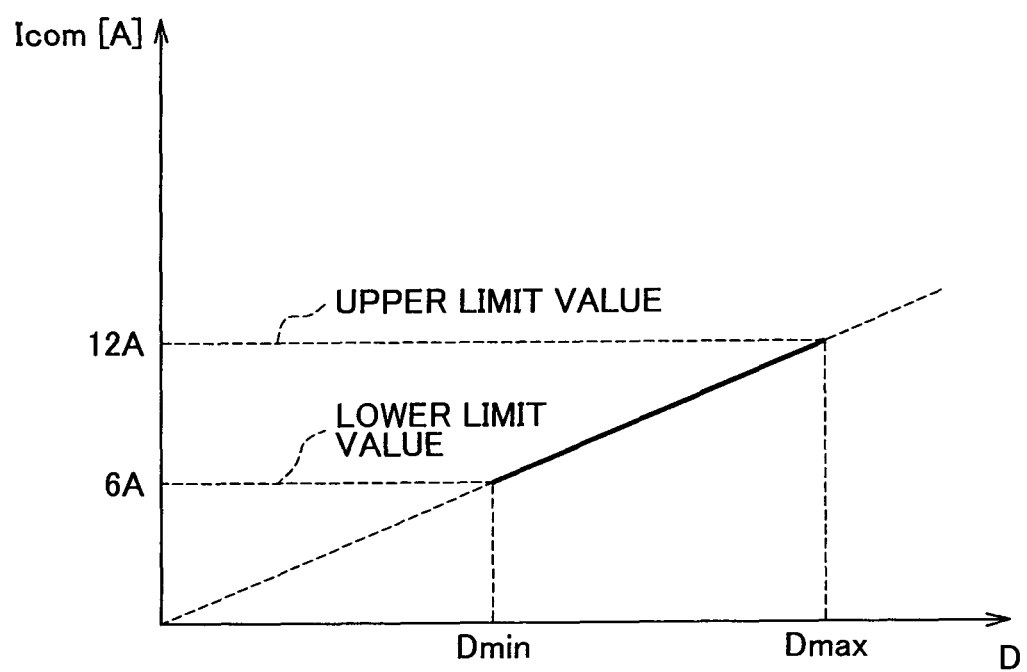
FIG. 7 is a second map used to calculate a duty ratio D of the pilot signal.

FIG. 7 shows the second map used to calculate the duty ratio D of the pilot signal CPLT. The second map prestores the duty ratio D of the pilot signal CPLT corresponding to the current command value Icom. In the second map, as the current command value Icom increases, the duty ratio D of the pilot signal CPLT is increased. However, the current command value Icom is limited to a value between the above described lower limit value and upper limit value. Thus, as shown in FIG. 7, the duty ratio D of the pilot signal CPLT is also controlled to a value that falls within the range from a minimum value Dmin to a maximum value Dmax.

Referring back to FIG. 5, the first generation unit 140 generates the pilot signal CPLT having the duty ratio D calculated by the conversion unit 130, and transmits the pilot signal CPLT to the vehicle 1 via the pilot signal line Lc.

On the other hand, the second generation unit 150 generates the switching signal S corresponding to the voltage command value Vcom calculated by the calculation unit 110, and transmits the switching signal S to the switching device SW. By so doing, the supply voltage becomes a value corresponding to the voltage command value Vcom.

Figure 8:
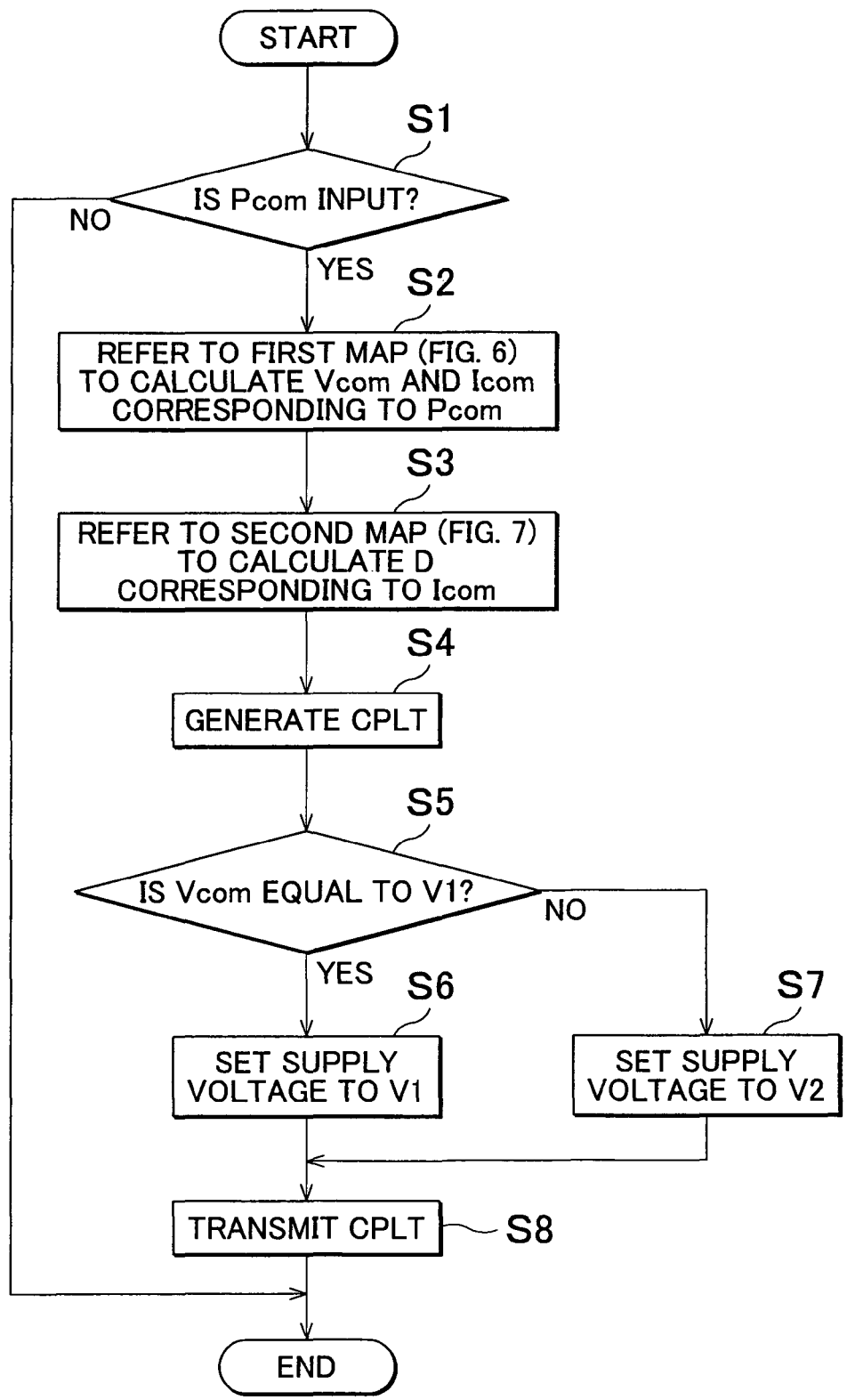
FIG. 8 is a flowchart that shows the control procedure of the ECU.

FIG. 8 is a flowchart that shows the control procedure for implementing the functions of the ECU 100. Steps (hereinafter step is abbreviated to "S") of the following flowchart are basically implemented through software processing executed by the ECU 100; however, the steps may be implemented by hardware, such as an electronic circuit provided for the ECU 100. Note that the process is repeatedly executed at a prescribed cycle time.

In S1, the ECU 100 determines whether the electric power command value Pcom is input. When the electric power command value Pcom is input (YES in S1), the process proceeds to S2. When the determination is negative (NO in S1), the process ends.

In S2, the ECU 100 refers to the first map shown in FIG. 6, and calculates the voltage command value Vcom and current command value Icom corresponding to the electric power command value Pcom.

In S3, the ECU 100 refers to the second map shown in FIG. 7, and calculates the duty ratio D of the pilot signal CPLT corresponding to the current command value Icom.

In S4, the ECU 100 generates the pilot signal CPLT having the duty ratio D calculated in S3.

In S5, the ECU 100 determines whether the voltage command value Vcom is the voltage V1. When the voltage command value Vcom is the voltage V1 (YES in S5), the process proceeds to S6. When the determination is negative (NO in S5), the process proceeds to S7.

In S6, the ECU 100 sets the supply voltage to the voltage V1. That is, the ECU 100 generates the switching signal S for causing the switch circuit S1 of the switching device SW to enter a state where the power line L(−) is connected to the neutral line Ln, and then transmits the switching signal S to the switching device SW.

In S7, the ECU 100 sets the supply voltage to the voltage V2. That is, the ECU 100 generates the switching signal S for causing the switch circuit S1 of the switching device SW to enter a state where the power line L(−) is connected to the power line L2, and then transmits the switching signal S to the switching device SW.

In S8, the ECU 100 transmits the pilot signal CPLT, generated in S4, to the vehicle 1 via the pilot signal line Lc.

As described above, in the first embodiment, the charging station that supplies electric power to an electromotive vehicle is provided with the switching device SW for switching the supply voltage. Then, the ECU 100 installed in the charging station executes both variable control of the duty ratio D of the pilot signal CPLT and switching control of the supply voltage (control of the switching device SW) on the basis of the electric power command value Pcom input from an outside. Therefore, it is possible to expand the controllable power range while using the existing pilot signal CPLT and pilot signal line Lc, so further detailed power control is possible.

Alternative Embodiment to First Embodiment

In the above described first embodiment, the upper limit value (current capacity) of the supply current is 12 amperes; however, the upper limit of the supply current may be larger than 12 amperes.

Figure 9:
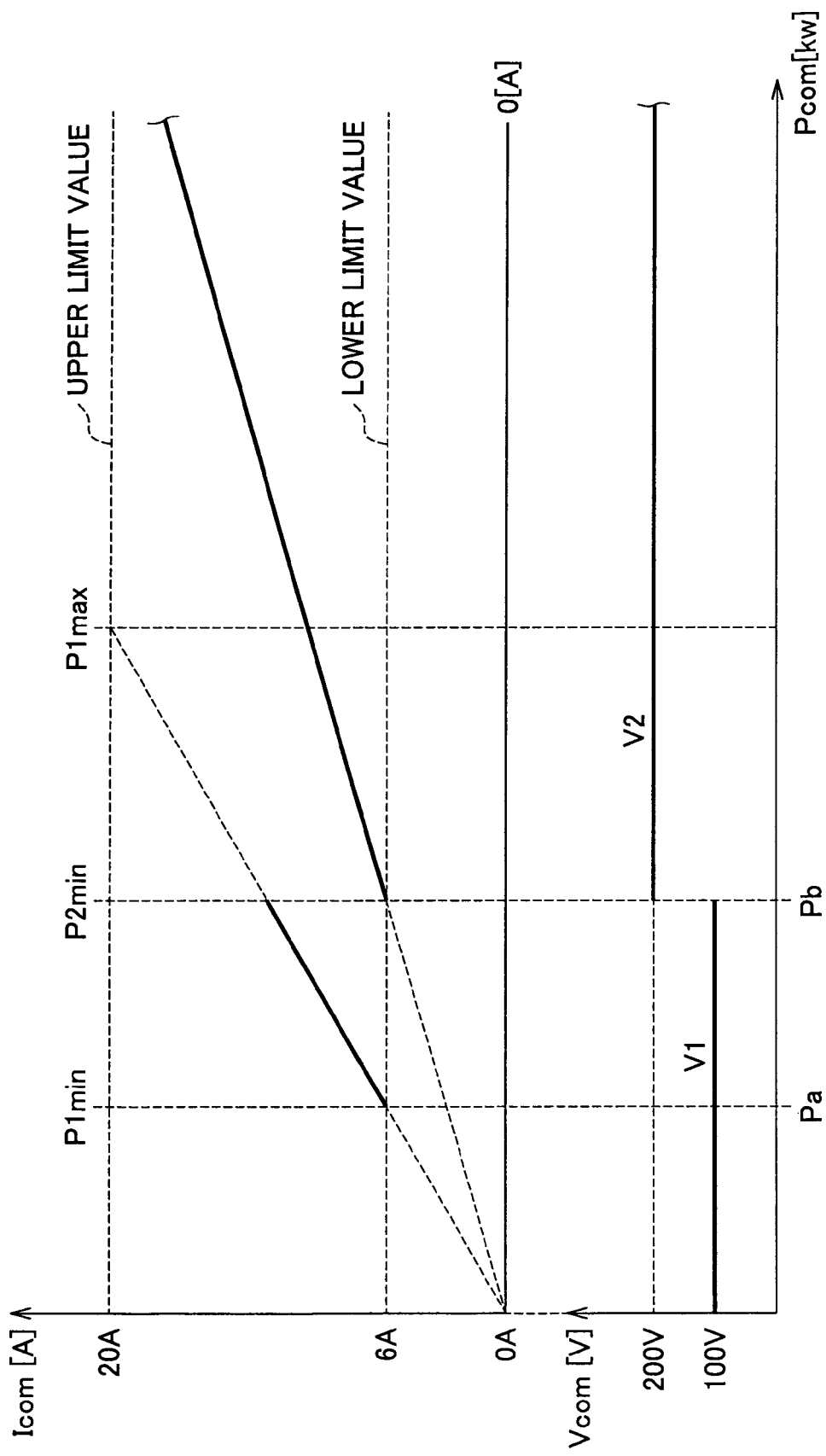
FIG. 9 is a first map that is used to calculate a voltage command value and a current command value according to an alternative embodiment to the first embodiment.

FIG. 9 shows a first map when the upper limit value of the supply current is 20 amperes. Note that, in FIG. 9, the voltage V1, the voltage V2 and the lower limit value of supply current are respectively 100 volts, 200 volts and 6 amperes as in the case of the first embodiment.

In this case, the electric power value P1max is set to 2 kilowatts (which is equal to 100 volts multiplied by 20 amperes), the electric power value P2min is 1.2 kilowatts (which is equal to 200 volts multiplied by 6 amperes), the electric power value P2min is smaller than the electric power value P1max, and the threshold Pb is set to 1.2 kilowatts that is the electric power value P2min.

That is, when the electric power command value Pcom falls within the range of the electric power value P2min to P1max, the supply voltage may be set to any one of the voltages V1 and V2; however, when the threshold Pb is set to the electric power value P2min smaller than the electric power value P1max, the supply voltage is preferentially set to the voltage V2 that is larger than the voltage V1. When the supply voltage is set to the voltage V2, the current command value Icom is reduced even when the same electric power is supplied to thereby make it possible to suppress loss (generation of Joule heat, or the like) in process of supplying electric power as compared with when the supply voltage is set to the voltage V1, so it is possible to improve charging efficiency.

Second Embodiment

In the first embodiment, the case where the supply voltage is set to any one of the two voltages V1 and V2 is described. In contrast to this, in a second embodiment, the case where the supply voltage is set to any one of three voltages V1, V2 and V3 will be described.

Figure 10:
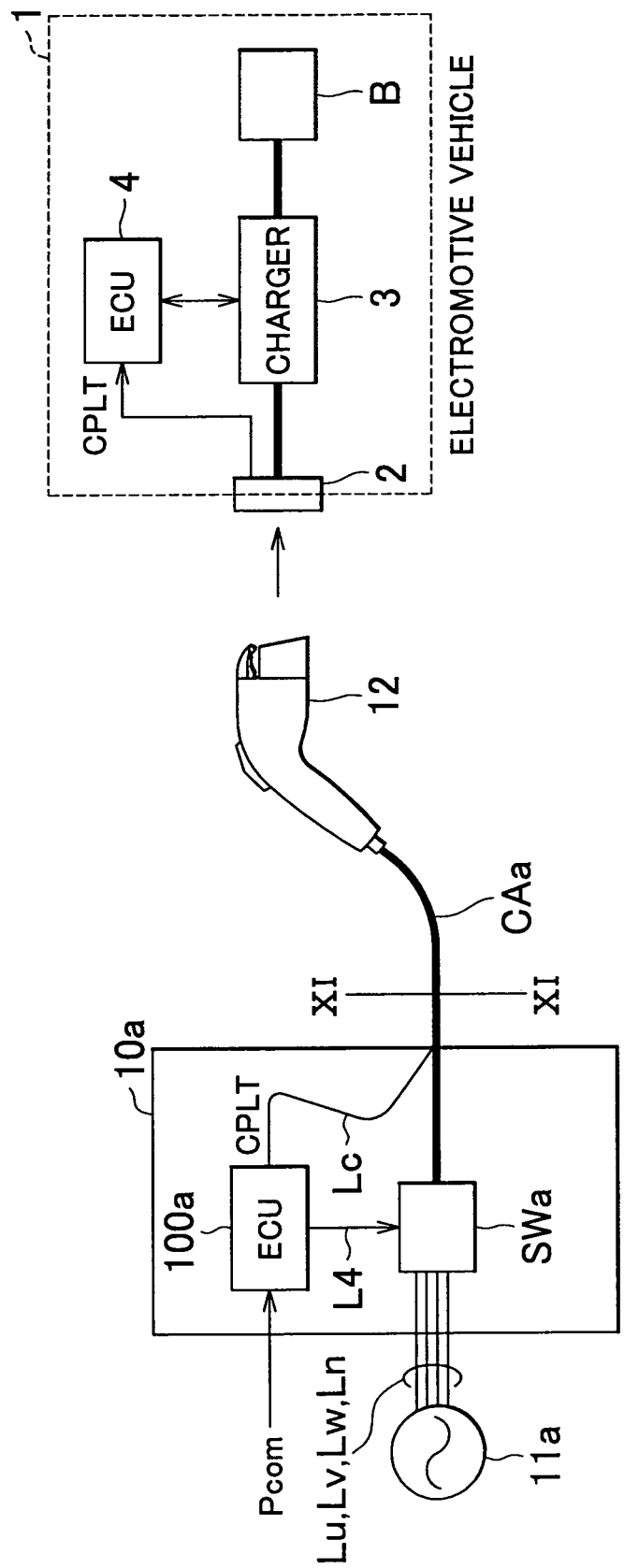
FIG. 10 is a schematic view of a charging station that is equipped with a power control device according to a second embodiment.

FIG. 10 is a schematic view of a charging station 10a that includes a power control device according to the second embodiment.

The charging station 10a includes a commercial power supply 11a, a switching device SWa, a charging cable CAa and an ECU 100a.

The commercial power supply 11a is a so-called three-phase four-wire system alternating-current power supply that is widely used in Europe, and the like. The commercial power supply 11a and the switching device SWa are connected by power lines Lu, Lv, Lw and a neutral line Ln. U-phase, V-phase and W-phase alternating-current powers are respectively supplied to the power lines Lu, Lv and Lw. The potential difference (phase voltage) between each of the power lines Lu, Lv and Lw and the neutral line Ln is the voltage V1. The voltage between the power lines (the potential difference between the power line Lu and the power line Lv, the potential difference between the power line Lv and the power line Lw and the potential difference between the power line Lw and the power line Lu) is the voltage V2. Note that, in the second embodiment, the case where the voltage V1 is 230 volts and the voltage V2 is 400 volts will be described as an example.

The switching device SWa switches the voltage, supplied from the commercial power supply 11a, to any one of the voltages V1, V2 and V3 and then supplies the any one of the voltages V1, V2 and V3 to the charging cable CAa.

Figure 11:
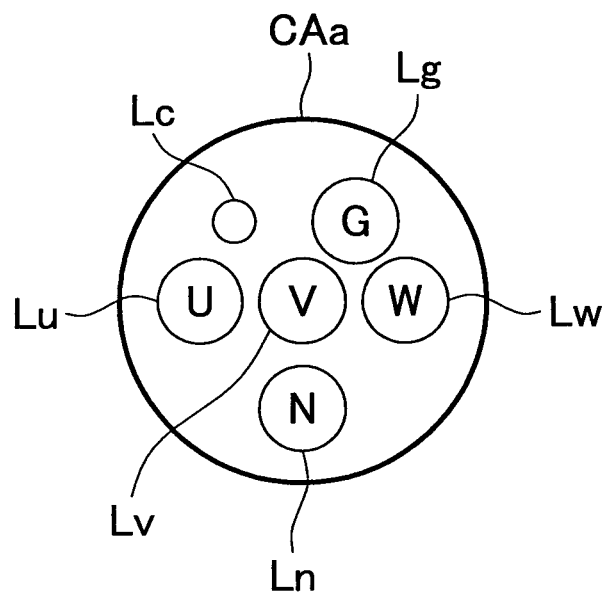
FIG. 11 is a cross-sectional view of a charging cable according to the second embodiment.

FIG. 11 is a cross-sectional view of the charging cable CAa, taken along the line XI-XI in FIG. 10. As shown in FIG. 11, the charging cable CAa is formed so that the power lines Lu, Lv and Lw, the neutral line Ln, the ground line Lg, and the pilot signal line Lc that extends from the ECU 100a are tied in a bundle as one cable.

On the basis of the electric power command value Pcom, the ECU 100a generates the pilot signal CPLT and then transmits the generated pilot signal CPLT to the vehicle 1 via the pilot signal line Lc, and also controls the switching device SWa to set the supply voltage, supplied from the charging station 10a to the vehicle 1, to any one of the voltages V1 to V3.

Figure 12:
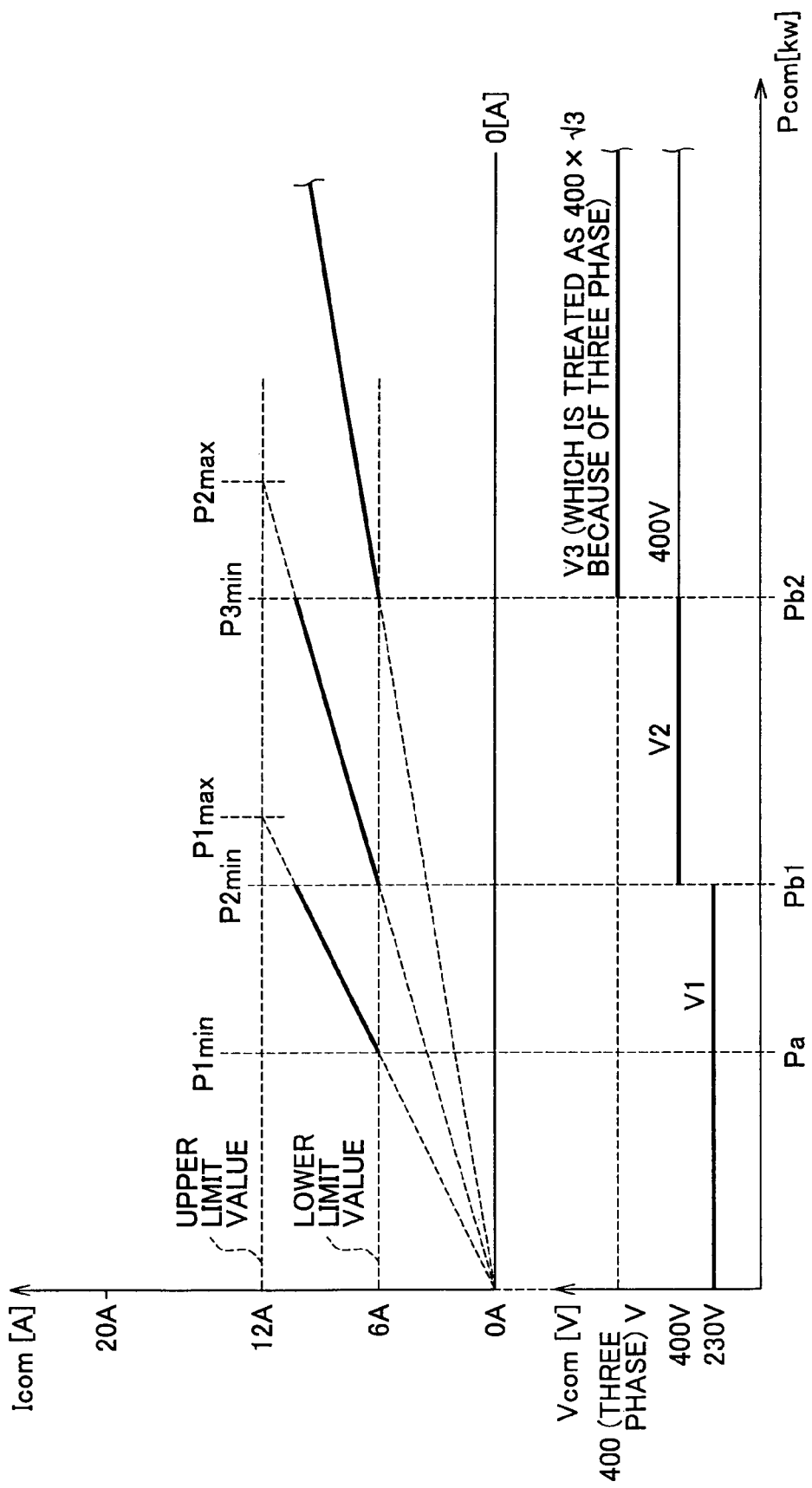
FIG. 12 is a first map used to calculate a voltage command value and a current command value according to the second embodiment.

FIG. 12 shows a first map used to calculate the voltage command value Vcom and the current command value Icom in the second embodiment.

Note that, in the following description, P1min, P2min and P3min respectively denote electric power values when the supply current is a lower limit value and the supply voltages are the voltages V1, V2 and V3, and P1max, P2max and P3max respectively denote electric power values when the supply current is an upper limit value and the supply voltages are the voltages V1, V2 and V3. In the second embodiment, the voltage V1 is 230 volts, the voltage V2 is 400 volts, the voltage V3 is 400 (three phase) volts (which is treated as 400 multiplied by $\sqrt{3}$ (volts) in terms of electric power), the upper limit value of the supply current is 6 amperes and the lower limit value of the supply current is 12 amperes. Therefore, P1min is 230 volts multiplied by 6 amperes, P1max is 230 volts multiplied by 12 amperes, P2min is 400 volts multiplied by 6 amperes, P2max is 400 volts multiplied by 12 amperes, P3min is 400 multiplied by $\sqrt{3}$ (volts) being multiplied by 6 amperes and P2max is 400 multiplied by $\sqrt{3}$ (volts) being multiplied by 12 amperes.

The ECU 100a according to the second embodiment sets the current command value Icom and voltage command value Vcom corresponding to the electric power command value Pcom through the same method as that of the first embodiment.

That is, the ECU 100a refers to the first map shown in FIG. 11. The ECU 100a sets the voltage command value Vcom to the voltage V1 when the electric power command value Pcom is smaller than a threshold Pb1, sets the voltage command value Vcom to the voltage V2 when the electric power command value Pcom falls within the range from the threshold Pb1 to a threshold Pb2, and sets the voltage command value Vcom to the voltage V3 when the electric power command value Pcom is larger than the threshold Pb2. Here, the threshold Pb1 is the electric power value P2min (the product of the voltage V2 and the lower limit value), and the threshold Pb2 is the electric power value P3min (the product of the voltage V3 and the lower limit value).

In addition, the ECU 100a sets the current command value Icom to Pcom divided by V1 when the electric power command value Pcom falls within the range from the threshold Pa to the threshold Pb1, sets the current command value Icom to Pcom divided by V2 when the electric power command value Pcom falls within the range from the threshold Pb1 to the threshold Pb2, and sets the current command value Icom to Pcom divided by V3 when the electric power command value Pcom falls within the range from the threshold Pb2 to the threshold Pc. Here, the threshold Pa is the electric power value P1min (the product of the voltage V1 and the lower limit value), and the threshold Pc is the electric power value P3max (the product of the voltage V3 and the upper limit value).

By so doing, the supply voltage may be switched among three levels (voltages V1, V2 and V3), so further detailed power control is possible. In addition, because the supply voltage is set to a higher value in a stepwise manner wherever possible on the condition that the current command value is not lower than the lower limit value, it is possible to preferentially set the current command value to a further smaller value, so loss in process of supplying electric power may be appropriately suppressed.

The embodiments described above are illustrative and not restrictive in all respects. The scope of the invention is defined by the appended claims rather than the above description. The scope of the invention is intended to encompass all modifications within the scope of the appended claims and equivalents thereof.

The invention claimed is:

1. A power control device that controls electric power supplied from an external power supply to a vehicle, the power control device comprising:
   a switch circuit that switches a supply voltage value of the external power supply; and
   a control unit that generates a signal, indicating an allowable current value of the external power supply, the signal being transmitted to the vehicle, and that controls the switch circuit to thereby control the supply voltage value, wherein
   the control unit changes the signal and the supply voltage value based on an electric power command value input to the control unit from an outside of the power control device and the vehicle.

2. The power control device according to claim 1, wherein the control unit sets a current command value and a voltage command value based on the electric power command value, generates the signal so that the allowable current value is equal to the current command value, and controls the switch circuit so that the supply voltage value is equal to the voltage command value.

3. The power control device according to claim 2, wherein the allowable current value has a lower limit value and an upper limit value, and
   the control unit sets the current command value and the voltage command value so that the current command value falls within a range from the lower limit value to the upper limit value and a product of the current command value and the voltage command value is equal to the electric power command value.

4. The power control device according to claim 3, wherein the switch circuit is configured to switch the supply voltage value to any one of a first voltage value and a second voltage value that is higher than the first voltage value,
   when the electric power command value is smaller than a threshold that is a product of the second voltage value and the lower limit value, the control unit sets the voltage command value to the first voltage value and sets the current command value to a value obtained by dividing the electric power command value by the first voltage value, and
   when the electric power command value is larger than the threshold, the control unit sets the voltage command value to the second voltage value and sets the current command value to a value obtained by dividing the electric power command value by the second voltage value.

5. The power control device according to claim 3, wherein the switch circuit is configured to switch the supply voltage value to any one of a first voltage value, a second voltage value that is higher than the first voltage value, and a third voltage value that is higher than the second voltage value,
   when the electric power command value is smaller than a first threshold that is a product of the second voltage value and the lower limit value, the control unit sets the voltage command value to the first voltage value and sets the current command value to a value obtained by dividing the electric power command value by the first voltage value,
   when the electric power command value falls within a range from the first threshold to a second threshold that is a product of the third voltage value and the lower limit value, the control unit sets the voltage command value to the second voltage value and sets the current command value to a value obtained by dividing the electric power command value by the second voltage value, and
   when the electric power command value is larger than the second threshold, the control unit sets the voltage command value to the third voltage value and sets the current command value to a value obtained by dividing the electric power command value by the third voltage value.

6. The power control device according to claim 1, wherein the switch circuit is provided in any location of a power supply line extending from the external power supply.

7. The power control device according to claim 1, wherein the signal is a pilot signal that oscillates with a pulse width corresponding to the allowable current value,
   the control unit transmits the pilot signal to the vehicle via a communication line, and
   the vehicle executes control for charging an electrical storage device provided on the vehicle based on the pilot signal received from the control unit.

8. The power control device according to claim 1, wherein the allowable current value is a current value that is supplied from the external power supply to the vehicle.

9. A control method for a power control device, the power control device controlling electric power supplied from an external power supply to a vehicle, the power control device including a switch circuit and a control unit, the method comprising:
   generating, by the control unit, a signal, that is transmitted to the vehicle, the signal indicating an allowable current value of the external power supply;
   controlling the switch circuit by the control unit such that a supply voltage value of the external power supply is switched to thereby control the supply voltage value; and
   changing, by the control unit, the signal and the supply voltage value based on an electric power command value input to the control unit from an outside of the power control device and the vehicle.

10. The power control device according to claim 1, wherein the switch circuit switches the supply voltage value of the external power supply by selectively connecting a power line of a charging cable to any one of a neutral line and a power line that extend from the external power supply; and
    the control unit controls the switch circuit to thereby control the supply voltage value by transmitting a switching signal to the switch circuit to selectively connect the power line of the charging cable to any one of the neutral line and the power line.

11. The method according to claim 9, wherein
    the switch circuit controls the supply voltage value by selectively connecting a power line of a charging cable to any one of a neutral line and a power line that extend from the external power supply, and
    the control unit transmits a switching signal to the switch circuit to selectively connect the power line of the charging cable to any one of the neutral line and the power line.

* * * * *